(12) United States Patent
Kim et al.

(10) Patent No.: US 8,953,303 B2
(45) Date of Patent: Feb. 10, 2015

(54) CATHODE ACTIVE MATERIAL FOR A LITHIUM ION CAPACITOR, AND METHOD FOR PRODUCING THE CATHODE ACTIVE MATERIAL

(75) Inventors: Young Jun Kim, Yongin-si (KR); Jeom-Soo Kim, Hwaseong-si (KR); Min Sik Park, Suwon-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 201 days.

(21) Appl. No.: 13/824,989

(22) PCT Filed: May 9, 2011

(86) PCT No.: PCT/KR2011/003430
§ 371 (c)(1),
(2), (4) Date: Mar. 18, 2013

(87) PCT Pub. No.: WO2012/046938
PCT Pub. Date: Apr. 12, 2012

(65) Prior Publication Data
US 2013/0188294 A1    Jul. 25, 2013

(30) Foreign Application Priority Data

Oct. 4, 2010    (KR) ........................ 10-2010-0096571

(51) Int. Cl.
*H01G 9/00*    (2006.01)
*H01G 11/32*    (2013.01)
(Continued)

(52) U.S. Cl.
CPC ............... *H01G 11/32* (2013.01); *H01G 11/06* (2013.01); *H01G 11/50* (2013.01); *Y02E 60/13* (2013.01)

USPC .......... 361/502; 361/516; 361/523; 361/532; 361/533

(58) Field of Classification Search
None
See application file for complete search history.

(56) References Cited

U.S. PATENT DOCUMENTS 6,346,348 B1    2/2002  Nakajima et al.
6,528,033 B1 *  3/2003  Barker et al. ................. 423/306
(Continued)

FOREIGN PATENT DOCUMENTS

JP       06-342673 A     12/1994
JP       2007115721       5/2007
(Continued)

OTHER PUBLICATIONS

International Search Report mailed Jan. 11, 2012 for PCT/KR2011/003430.

(Continued)

*Primary Examiner* — Dion R Ferguson
(74) *Attorney, Agent, or Firm* — Lowe Hauptman & Ham, LLP (57) ABSTRACT

The present invention relates to a lithium ion capacitor having excellent capacitance characteristics and high energy density. More particularly, the present invention relates to a cathode active material for a lithium ion capacitor, which utilizes a lithium composite metal oxide having a large initial irreversible capacitance as a specific cathode additive in addition to a carbon-based material applied as a cathode active material, and a production method thereof, and a lithium ion capacitor including the same.

According to the present invention, lithium can be electrochemically doped on an anode without using metal lithium, and the capacitance characteristics of a lithium ion capacitor and the safety of a lithium-doping process can be significantly improved.

13 Claims, 8 Drawing Sheets

(51) Int. Cl.
*H01G 11/06* (2013.01)
*H01G 11/50* (2013.01)

(56) References Cited

U.S. PATENT DOCUMENTS

| | | | |
|---|---|---|---|
| 6,878,490 B2 * | 4/2005 | Gao et al. | 429/231.1 |
| 2008/0171264 A1 | 7/2008 | Takeuchi et al. | |
| 2010/0021807 A1 * | 1/2010 | Lee et al. | 429/129 |

FOREIGN PATENT DOCUMENTS

| | | |
|---|---|---|
| JP | 2010-009799 A | 1/2010 |
| KR | 100769567 | 6/2007 |
| KR | 100834053 | 4/2008 |
| KR | 1020080081297 | 9/2008 |
| KR | 1020100002107 | 1/2010 |
| KR | 1020100064632 | 6/2010 |
| WO | 0227825 A1 | 4/2002 |

OTHER PUBLICATIONS

Written Opinion from ISA mailed Jan. 11, 2012 for PCT/KR2011/003430.

Japanese Office Action dated Dec. 17, 2013.

* cited by examiner

CATHODE ACTIVE MATERIAL FOR A LITHIUM ION CAPACITOR, AND METHOD FOR PRODUCING THE CATHODE ACTIVE MATERIAL

CROSS REFERENCE TO RELATED APPLICATION

This application claims the priority of Korean Patent Application No. 10-2010-0096571, filed on Oct. 4, 2010 in the KIPO (Korean Intellectual Property Office). Further, this application is the National Phase application of International Application No. PCT/KR2011/003430 filed May 9, 2011, which designates the United States and was published in Korean.

TECHNICAL FIELD

The present invention relates to a lithium ion capacitor having excellent capacitance characteristics and high energy density. More particularly, the present invention relates to a cathode active material for a lithium ion capacitor, in which a lithium composite metal oxide having a large initial irreversible capacitance as an alternative lithium supply source to metal lithium for electrochemical lithium doping is added as a cathode additive to a carbon-based material applied as a cathode active material, and a production method thereof.

BACKGROUND ART

As the supply of portable small electrical and electronic devices is expanding, new secondary batteries such as a nickel metal hydride battery, a lithium secondary battery, a super capacitor, and a lithium ion capacitor have been actively developed.

Among them, the lithium ion capacitor (LIC) is a new concept of the secondary battery system, which combines the high output/long-life characteristics of conventional electric double layer capacitors (EDLC) with the high energy density characteristic of lithium ion batteries.

The electric double layer capacitor utilizing physical adsorption of charges in the electric double layer has excellent output and life span characteristics, but its low energy density limits its use in many applications. To solve this problem of the electric double layer capacitor, a hybrid capacitor has been suggested, in which energy density is improved by using a material capable of intercalating and extracting lithium ions as a cathode or anode active material. In particular, the lithium ion capacitor has been suggested, in which a material used in the conventional electric double layer capacitors is used as a cathode material and a carbon-based material capable of intercalating and extracting lithium ions is used as an anode active material.

Figure 1:
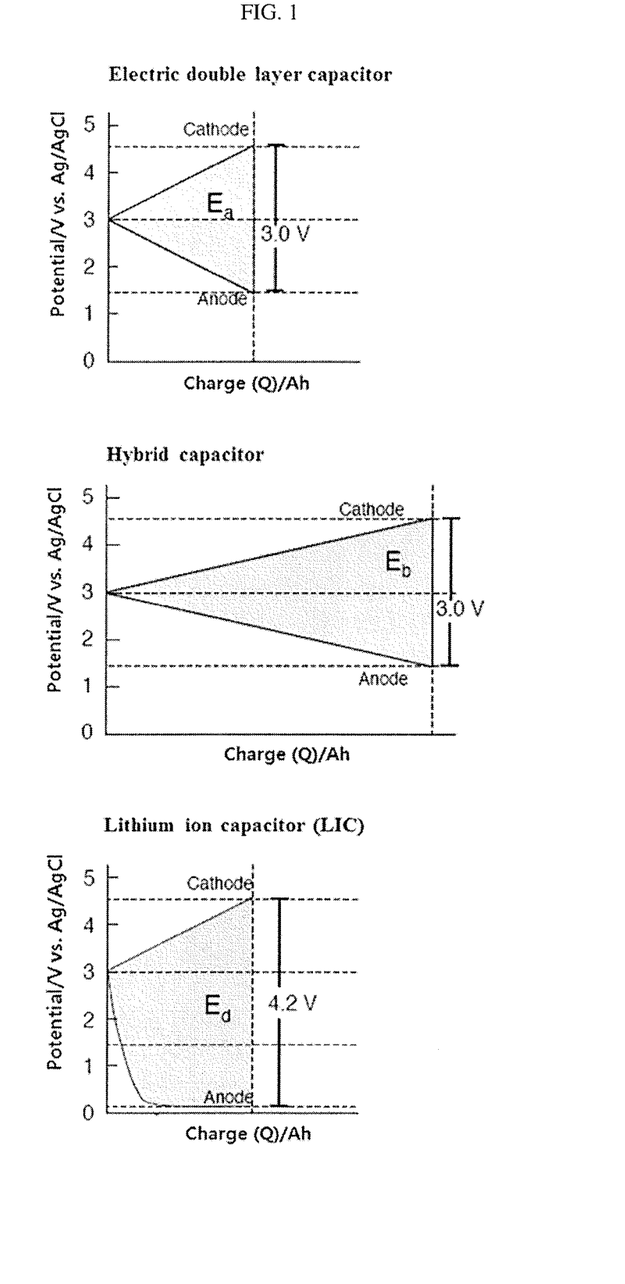
FIG. 1 is a diagram showing general charge/discharge characteristics of an electric double layer capacitor (EDLC), a hybrid capacitor, and a lithium ion capacitor (LIC)

For instance, as shown in FIG. 1, the electric double layer capacitor shows excellent output characteristic, based on adsorption and desorption of charges by symmetrical use of an activated carbon material having a high specific surface area for both cathode and anode, but it has a drawback of low energy density ($E_a$). In contrast, the hybrid capacitor has the characteristic of high capacitance ($E_b$) by utilizing high-capacitance transition metal oxide as the cathode material, and the lithium ion capacitor has the characteristic of improved energy density ($E_d$) by utilizing the carbon-based material capable of reversibly intercalating and extracting lithium ions as the anode material.

Of them, since the lithium ion capacitor utilizes a material capable of intercalating and extracting lithium ions at a low reaction potential as the anode active material, it shows much higher improvement in energy density than other hybrid capacitors. In the lithium ion capacitor, lithium ions having high ionization tendency is pre-doped on the anode to greatly reduce the electrical potential of the anode. Further, the lithium ion capacitor has a cell voltage of 3.8 V which is much higher than 2.5 V of conventional electric double layer capacitors, and higher energy density.

With regard to the reaction mechanism of the lithium ion capacitor which includes an anode consisting of a carbon-based material doped with lithium ions, electrons are transported to the carbon-based material of the anode and thus the carbon-based material is negatively charged, leading to intercalation of lithium ions into the carbon-based material of the anode, at the time of charging. Meanwhile, lithium ions intercalated into the carbon-based material of the anode are extracted and the negative ions are adsorbed on the cathode, at the time of discharging. Doping amount of the anode with lithium ions can be controlled by this reaction mechanism, thereby providing a lithium ion capacitor having a high energy density. Further, the lithium ion capacitor is a system that combines the good energy storage of lithium ion batteries with the high output characteristic of capacitors, and is a futuristic battery system that exhibits the capacitor characteristics at a high output power and the life span as long as that of lithium ion batteries by utilizing a material having both of the functions.

However, the lithium ion capacitor requires electrochemical adsorption/desorption as well as a lithium doping process for lithium intercalation and extraction. In the conventional technology of doping the anode with lithium for the lithium ion capacitor, metal lithium is laminated onto an electrode, and then the negative electrode and metal lithium are short-circuited by injection of an electrolytic solution, and at this time, an electrical potential difference occurs between the negative electrode and the lithium metal, so that it is possible to naturally dope the lithium metal into the negative electrode. The lithium doping method carried out by laminating metal lithium onto the electrode and short-circuiting them, however, has problems that it is difficult to control the doping amount of lithium on the negative electrode and safe handling of lithium metal should be secured during the doping process, and thus the method is not suitable for large scale use.

Accordingly, there is a need to develop a material for lithium ion capacitor, which exhibits excellent capacitor characteristics of high output power, long life span and high energy density and has excellent safety to be suitable for large scale use, and a production process thereof.

DISCLOSURE

Technical Problem

The present invention provides a cathode active material for a lithium ion capacitor, which utilizes a cathode additive having a large initial irreversible capacitance as a lithium supply source in addition to a carbon-based cathode material so that lithium can be electrochemically doped on an anode without using metal lithium.

Further, the present invention provides a production method of the cathode active material for a lithium ion capacitor.

Furthermore, the present invention provides a lithium ion capacitor including the cathode active material.

Technical Solution

The present invention provides a cathode active material for a lithium ion capacitor, including lithium composite metal oxide represented by the following Chemical Formula 1 and a carbon-based material.

$$Li_xM_yO_z \quad \text{[Chemical Formula 1]}$$

wherein x, y, and z are $0<x\leq2$, $0<y\leq3$, and $0<z\leq4$, respectively, and M is one or more selected from the group consisting of Mo, Ir, and Pt.

Further, the present invention provides a production method of the cathode active material for a lithium ion capacitor, including the steps of reducing a lithium composite metal oxide precursor represented by the following Chemical Formula 2 to produce lithium composite metal oxide represented by the following Chemical Formula 1; and mixing the lithium composite metal oxide with a carbon-based material.

$$Li_xM_yO_z \quad \text{[Chemical Formula 1]}$$

$$Li_{x'}M'_{y'}O_{z'} \quad \text{[Chemical Formula 2]}$$

wherein x, y, z, x', y', and z' are $0<x\leq2$, $0<y\leq3$, z $0<z\leq4$, $0<x'\leq2$, $0<y'\leq3$, and $1<z'\leq5$, respectively, and M and M' are one or more selected from the group consisting of Mo, Ir, and Pt, respectively.

Further, the present invention provides a lithium ion capacitor including the cathode active material.

Best Mode

Hereinafter, a cathode active material of a lithium ion capacitor and a production method thereof, and a lithium ion capacitor including the same according to specific embodiments of the present invention will be described in more detail. However, these embodiments are for illustrative purposes only, and the scope of the present invention is not intended to be limited by these embodiments, and those skilled in the art will appreciate that various modifications are possible in the exemplary embodiments, without departing from the scope of the invention.

Additionally, unless otherwise specified, the term "comprising" or "including", as used herein, means to include any elements (or components) without limitation, but do not preclude the addition of other elements (or components).

As used herein, the term "lithium ion capacitor" refers to a secondary battery system which is an asymmetric type with different electrodes as the cathode and anode, and is intended to improve capacitance characteristics by using an electrode material having high capacitance characteristic in one electrode and an electrode material having high output characteristic in the counter electrode. Such lithium ion capacitor is characterized in that it has a high energy density per unit weight because a carbon-based material having a large capacitance and capable of intercalating and extracting lithium ions, for example, graphite, hard carbon, or soft carbon, is generally used as an anode material for electrochemical adsorption/desorption and intercalation and extraction of lithium ions at a low electrical potential. As shown in FIG. 1, the lithium ion capacitor has a high electrical potential of 4.2 V whereas an electric double layer capacitor and a hybrid capacitor have an electrical potential of approximately 3.0 V, and has superior capacitance characteristic ($E_d$), thereby exhibiting high energy density.

As described above, however, the lithium ion capacitor requires electrochemical adsorption/desorption as well as a lithium doping process for lithium intercalation and extraction, and the conventional doping process of laminating metal lithium onto an electrode and electrically short-circuiting them has drawbacks that it is difficult to control the doping amount of lithium on the negative electrode and to secure safe handling of lithium metal during the doping process.

In the present invention, therefore, lithium is electrochemically doped onto the negative electrode by addition of a specific cathode additive as a lithium supply source to a carbon-based material applied as a cathode active material so that the doping efficiency and safety are remarkably improved and excellent safety to be suitable for large scale use is secured, resulting in process improvement.

In particular, the experimental results of the present inventors revealed that a lithium ion capacitor manufactured by using a cathode active material including lithium composite metal oxide having specific characteristics as a cathode additive has excellent capacitor characteristics of high output power, long life span, and high energy density, and exhibits excellent process safety as an alternative to the doping process using lithium metal.

According to one embodiment of the present invention, provided is a cathode active material for a lithium ion capacitor, including a cathode additive having specific characteristics. The cathode active material for a lithium ion capacitor includes the specific cathode additive, that is, lithium composite metal oxide represented by the following Chemical Formula 1, in addition to the carbon-based material.

$$Li_xM_yO_z \quad \text{[Chemical Formula 1]}$$

wherein x, y, and z are $0<x\leq2$, $0<y\leq3$, and $0<z\leq4$, respectively, and M is one or more selected from the group consisting of Mo, Ir, and Pt.

In Chemical Formula 1 of the lithium composite metal oxide, x, y, z are $0<x\leq2$, $0<y\leq3$, and $0<z\leq4$, preferably $1\leq x<2$, $0<y\leq2$, and $0<z\leq3$, and more preferably x=2, y=1, z=3, respectively.

In the lithium composite metal oxide, the metal component M to form oxide together with lithium may be Mo, Ir, Pt or the like. Mo, Ir, and Pt are transition metals, and the cathode additive including this transition metal is a transition metal oxide. Since Mo, Ir, and Pt have symmetric forms of Rhombohedral in a crystal structure, they have an advantage of more effectively inducing electrochemical intercalation and extraction of lithium ions.

The lithium composite metal oxide may be one or more selected from the group consisting of $Li_2MoO_3$, $Li_2PtO_3$, and $Li_2IrO_3$.

The cathode active material for a lithium ion capacitor of the present invention is characterized in that electrochemical doping of the anode with lithium ions is performed by addition of the specific cathode additive having a large initial irreversible capacitance to the carbon-based material applied as the cathode active material, thereby improving safety hazard due to the use of lithium metal and improving the capacitance and energy density of the capacitor.

Figure 2:
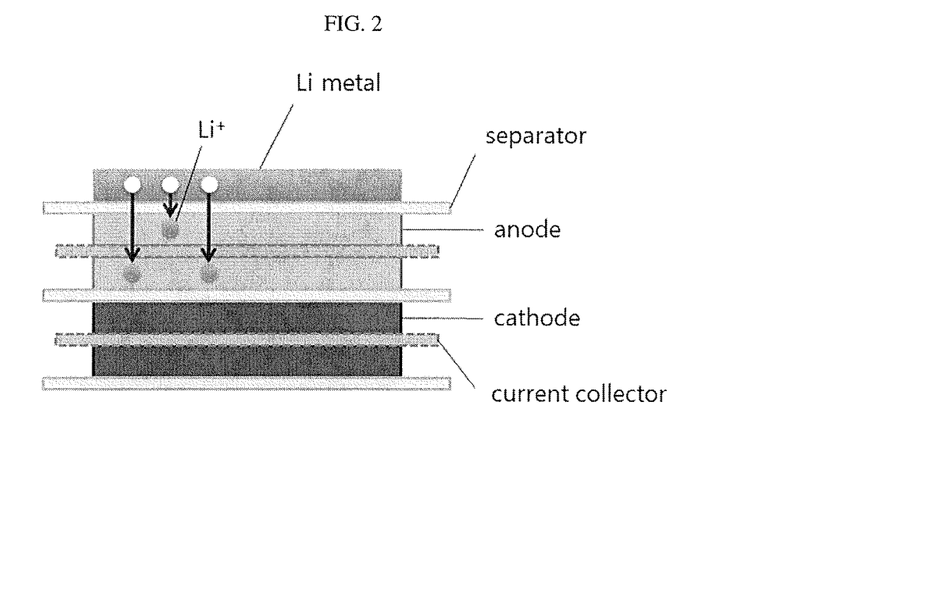
FIG. 2 is a diagram showing a general structure of a conventional lithium ion capacitor (LIC)
Figure 3:
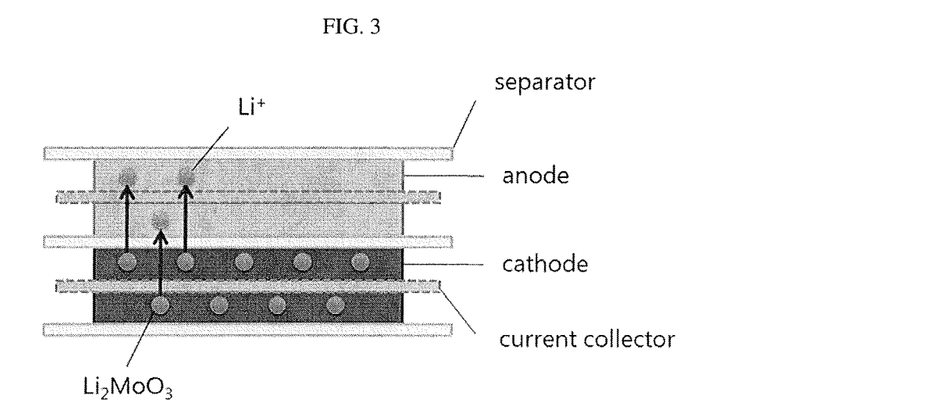
FIG. 3 is a diagram showing a structure of a lithium ion capacitor (LIC) according to the present invention.

In the conventional lithium ion capacitor, as shown in FIG. 2, a lithium supply source transporting lithium ions to the anode is formed by electrically short-circuiting the lithium metal laminated on the electrode. However, as shown in FIG. 3, the lithium ion capacitor of the present invention is characterized in that a specific cathode additive, i.e., $Li_2MoO_3$ is added to the cathode active material, and used as a lithium supply source, thereby effectively transporting lithium ions to the anode without formation of the lithium metal laminate.

Therefore, as described above, the lithium composite metal oxide of the present invention that is used as the cathode additive may have a crystal structure of Rhombohedral for effective electrochemical intercalation and extraction of lithium ions. Lithium can be effectively doped on the anode owing to the large initial irreversible capacitance of the lithium composite metal oxide.

Further, the lithium composite metal oxide has a characteristic of reversibly intercalating or extracting lithium ions in a voltage region of 0 V to 5 V, preferably 2 V to 5 V, and more preferably 2.3 V to 5 V. In particular, the lithium composite metal oxide has the large initial irreversible capacitance characteristic so that lithium ions can be electrochemically supplied to the anode without using metal lithium.

Therefore, the lithium composite metal oxide may have an initial charge-discharge efficiency ($Q_E$) of the following Equation 1 of 50% or less, or 0% to 50%, preferably 40% or less, or 0% to 40%, and more preferably 30% or less, or 0% to 30%.

$$Q_E = (Q_D/Q_C) \times 100 \quad \text{[Equation 1]}$$

wherein $Q_E$ represents an initial charge-discharge efficiency of lithium composite metal oxide, $Q_D$ represents a discharge capacitance (mAh/g) at a Li/Li+ cut-off discharge voltage of 2.3 V, and $Q_C$ represents a charge capacitance (mAh/g) at a Li/Li+ cut-off charge voltage of 4.7 V.

Figure 4:
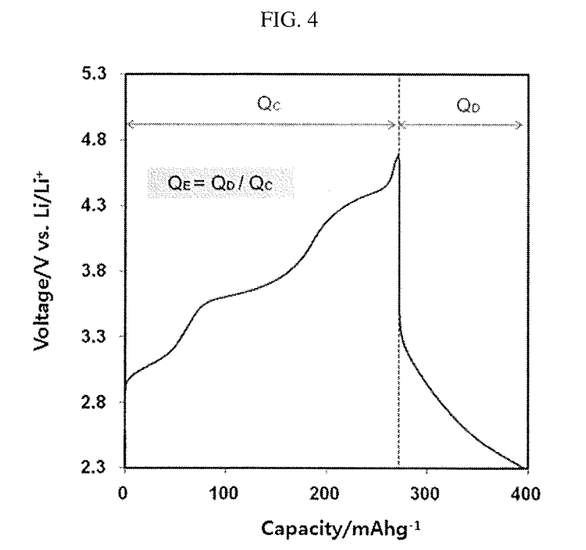
FIG. 4 is a reference graph regarding initial charge-discharge efficiency of a cathode additive according to the present invention.

As shown in FIG. 4, the initial charge-discharge efficiency ($Q_E$) of the lithium composite metal oxide can be calculated according to Equation 1 by determining the discharge capacitance ($Q_D$, mAh/g) per unit weight of the cathode active material at a Li/Li+ cut-off voltage of 2.3 V and the charge capacitance ($Q_C$, mAh/g) per unit weight of the cathode active material at a Li/Li+ cut-off voltage of 4.7 V by the electrochemical method at a constant current or constant voltage in a half cell with lithium as a counter electrode.

Here, the discharge capacitance ($Q_D$) per unit weight of the lithium composite metal oxide at a Li/Li+ cut-off voltage of 2.3 V based on the total weight of the lithium composite metal oxide may be 135 mAh/g or less, or 0 to 135 mAh/g, preferably 110 mAh/g or less, or 0 to 110 mAh/g, and more preferably 85 mAh/g or less, or 0 to 85 mAh/g. Further, the charge capacitance ($Q_C$) per unit weight of the lithium composite metal oxide at a Li/Li+ cut-off voltage of 4.7 V based on the total weight of the lithium composite metal oxide may be 200 mAh/g or more, preferably 230 mAh/g or more, and more preferably 250 or more, or 250 to 500 mAh/g, and if necessary, 500 mAh/g or less, 250 mAh/g or less, or 230 mAh/g or less.

In terms of capacitance, it is preferable that the initial charge-discharge efficiency ($Q_E$) of lithium composite metal oxide, the discharge capacitance ($Q_D$, mAh/g) at a Li/Li+ cut-off voltage of 2.3 V, and the charge capacitance ($Q_C$, mAh/g) at a Li/Li+ cut-off voltage of 4.7 V are maintained within the above described range.

Meanwhile, the carbon-based material of the present invention that is used as the cathode active material for a lithium ion capacitor refers to activated carbon having a high specific surface area, and the specific surface area may be 500 m²/g or higher, preferably 700 m²/g or higher, and more preferably 1,000 m²/g higher, or 1,000 to 3,000 m²/g, and if necessary, 3,000 m²/g or lower, 2,500 m²/g or lower, 2,000 m²/g or lower. The carbon-based material may be one or more of activated carbon, a composite of activated carbon and metal oxide, and a composite of activated carbon and a conductive polymer. Among them, activated carbon is preferred in terms of conductivity.

The cathode active material for a lithium ion capacitor according to the present invention is composed of the carbon-based material and lithium composite metal oxide as the cathode additive which is a lithium supply source of the anode material. In particular, the cathode active material for a lithium ion capacitor according to the present invention may include 0.5 to 50% by weight of lithium composite metal oxide and 50 to 99.5% by weight of carbon-based material, preferably 1.0 to 35% by weight of lithium composite metal oxide and 65 to 99% by weight of carbon-based material, and more preferably 1.5 to 20% by weight of lithium composite metal oxide and 80 to 98.5% by weight of carbon-based material. Here, the lithium composite metal oxide and the carbon-based material may be included in an amount of 0.5% by weight or more and 99.5% by weight or less, respectively for effective electrochemical doping of anode with lithium, and in an amount of 50% by weight or less and 50% by weight or more, respectively for excellent conductivity.

Depending on the addition amount of the lithium composite metal oxide to the carbon-based material, it may be uniformly mixed throughout the carbon-based material or partially mixed therein.

As described above, the cathode additive according to the present invention, i.e., lithium composite metal oxide of Chemical Formula 1 is able to electrochemically dope lithium on the carbon-based anode active material, and the doped lithium ions contribute to the capacitor characteristics to reduce the cell voltage, resulting in improvement of capacitance and energy density of the lithium ion capacitor.

Meanwhile, according to another embodiment of the present invention, provided is a production method of the cathode active material for the lithium ion capacitor. The production method of the cathode active material for the lithium ion capacitor may include the steps of mixing a lithium composite metal oxide precursor represented by the following Chemical Formula 2 with a carbon-based material; reducing the lithium composite metal oxide precursor represented by the following Chemical Formula 2 to produce lithium composite metal oxide represented by the following Chemical Formula 1; and mixing the lithium composite metal oxide with the carbon-based material.

$$Li_xM_yO_z \quad \text{[Chemical Formula 1]}$$

$$Li_xM'_{y'}O_{z'} \quad \text{[Chemical Formula 2]}$$

wherein x, y, z, x', y', z' are 0<x≤2, 0<y≤3, and 0<z≤4, 0<x'≤2, 0<y'≤3, and 1<z'≤5, preferably 1<x≤2, 0<y≤2, and 0<z≤3, 0<x'≤2, 0<y'≤2, and 1<z'≤4, and more preferably x=2, y=1, z=3, x'=2, y'=1, z'=4, respectively and M and M' are one or more selected from the group consisting of Mo, Ir, and Pt, respectively.

In the production method of the cathode active material for the lithium ion capacitor according to the present invention, the lithium composite metal oxide and the precursor thereof, and the carbon-based material as the cathode active material are as those described in the cathode active material for the lithium ion capacitor.

The process of reducing the lithium composite metal oxide precursor of Chemical Formula 2 may be performed by heat-treatment at 500 to 1,000° C., preferably at 700 to 900° C., and more preferably at 700 to 800° C. Further, the heat-treatment process may be performed for 2 to 50 hours, preferably for 5 to 30 hours, and more preferably for 10 to 20 hours. By maintaining the temperature and time of the heat-treatment process within the above range, the lithium composite metal oxide precursor of Chemical Formula 2 can be effectively converted into lithium composite metal oxide of Chemical Formula 1.

Further, the process of reducing the lithium composite metal oxide precursor may be performed under an inert atmosphere of argon (Ar) gas with hydrogen ($H_2$) or the like. In terms of improvement of process efficiency, it is preferable that the process is performed under the conditions with 5% or less of $H_2$.

Through this reduction process, the lithium composite metal oxide of Chemical Formula 1 having the above described characteristics can be produced.

Meanwhile, the lithium composite metal oxide precursor may be prepared by a heat-treatment process of a mixture of a lithium compound such as $Li_2CO_3$, LiOH, and Li and a transition metal compound such as $MoO_3$, $MoO_2$, $(NH_4)_6Mo_7O_{24}\cdot 4H_2O$, $MoS_2$, Mo, $IrCl_3$, $IrO_2$, $PtCl_4$, $PtCl_2$, $PtO_2$, and $Pt(C_5H_7O_2)_2$. At this time, the lithium compound and the transition metal compound may be mixed at a molar ratio considering the values of x, y, and z in the final product, lithium composite metal oxide of Chemical Formula 1, and for example, at a ratio of 2:1 to 3:1, preferably at a ratio of 2:1 to 2.5:1, and more preferably at a ratio of 2:1 to 2.3:1. Further, after mixing the lithium compound and the metal composite compound, the heat-treatment process may be performed at 400 to 1,000° C., preferably at 500 to 900° C., and more preferably at 500 to 800° C. Further, the heat-treatment process of the lithium compound and the metal composite compound may be performed for 0.5 to 20 hours, preferably for 1 to 15 hours, and more preferably for 2 to 10 hours. The heat-treatment process of the lithium compound and the metal composite compound may be performed under an oxygen or air atmosphere.

In the production method of the cathode active material for lithium ion capacitor according to the present invention, the step of mixing the lithium composite metal oxide of Chemical Formula 1 with the carbon-based material may be performed by a variety of physical methods. In this regard, the lithium composite metal oxide and the carbon-based material as the cathode active material may be mixed in an amount of 0.5 to 50% by weight and 50 to 99.5% by weight, preferably 1.0 to 35% by weight and 65 to 99% by weight, and more preferably 1.5 to 20% by weight and 80 to 98.5% by weight, respectively.

Meanwhile, according to still another embodiment of the present invention, provided is a lithium ion capacitor including the cathode active material for lithium ion capacitor. The lithium ion capacitor is characterized in that it is able to effectively transport lithium ions to the anode by using the specific lithium composite metal oxide having a large initial irreversible capacitance as the cathode additive without formation of additional lithium metal layer.

In particular, the lithium ion capacitor of the present invention includes a cathode containing the cathode active material; an anode containing an anode active material; and a separator between the cathode and the anode, in which the anode is supplied with lithium ions only from the cathode.

In this regard, the phrase "supplied with lithium ions only from the cathode" means that the anode is supplied with lithium ions only derived from the lithium composite metal oxide included in the cathode active material without an additional layer for supplying lithium ions to the anode, for example, an additional lithium metal layer included in the anode or laminated (coated) on the anode, as shown in FIG. 3.

The lithium ion capacitor of the present invention may include a carbon-based anode active material capable of reversely intercalating or extracting lithium ions in a voltage region of 0 V to 5 V.

The cathode active material including the lithium composite metal oxide of Chemical Formula 1 according to the present invention is characterized in that it constitutes the lithium ion capacitor together with the carbon-based anode active material capable of reversely intercalating or extracting lithium ions for effectively doping the anode with lithium. However, if the lithium composite metal oxide according to the present invention is applied as the cathode additive in the hybrid capacitor which utilizes the conventional activated carbon anode other than the anode active material of the lithium ion capacitor (cathode: activated carbon+$Li_2MoO_3$, anode: activated carbon), the capacitance and life span of the capacitor can be greatly reduced due to the large initial irreversible capacitance of the cathode additive itself.

Meanwhile, the lithium ion capacitor according to the present invention may exhibit excellent performance in that its charge/discharge capacitance measured by the electrochemical method is 50 F/g or higher, preferably 70 F/g or higher, and more preferably 100 F/g higher or 100 to 800 F/g, and if necessary, 750 F/g or lower, or 700 F/g or lower.

As described above, the lithium ion capacitor according to the present invention can be manufactured by electrochemically doping the anode with lithium using the lithium composite metal oxide having a large initial irreversible capacitance in addition to the cathode active material, without using the lithium metal electrode or lithium metal as a lithium supply source.

Hereinafter, specific embodiments of the cathode active material for the lithium ion capacitor of the present invention and the method for manufacturing the lithium ion capacitor using the same will be described in more detail with reference to the accompanying drawings.

Figure 5:
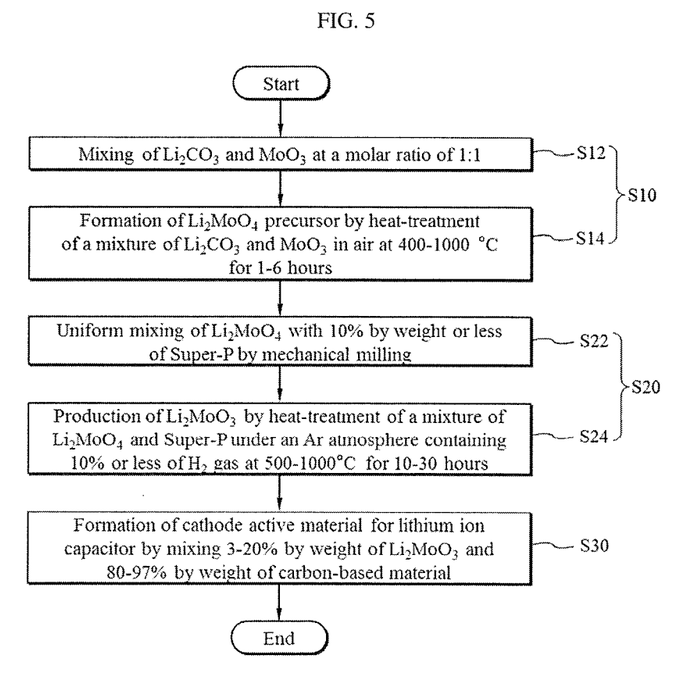
FIG. 5 is a flow chart showing a method for manufacturing a cathode for the lithium ion capacitor using the cathode additive according to the present invention.
Figure 6:
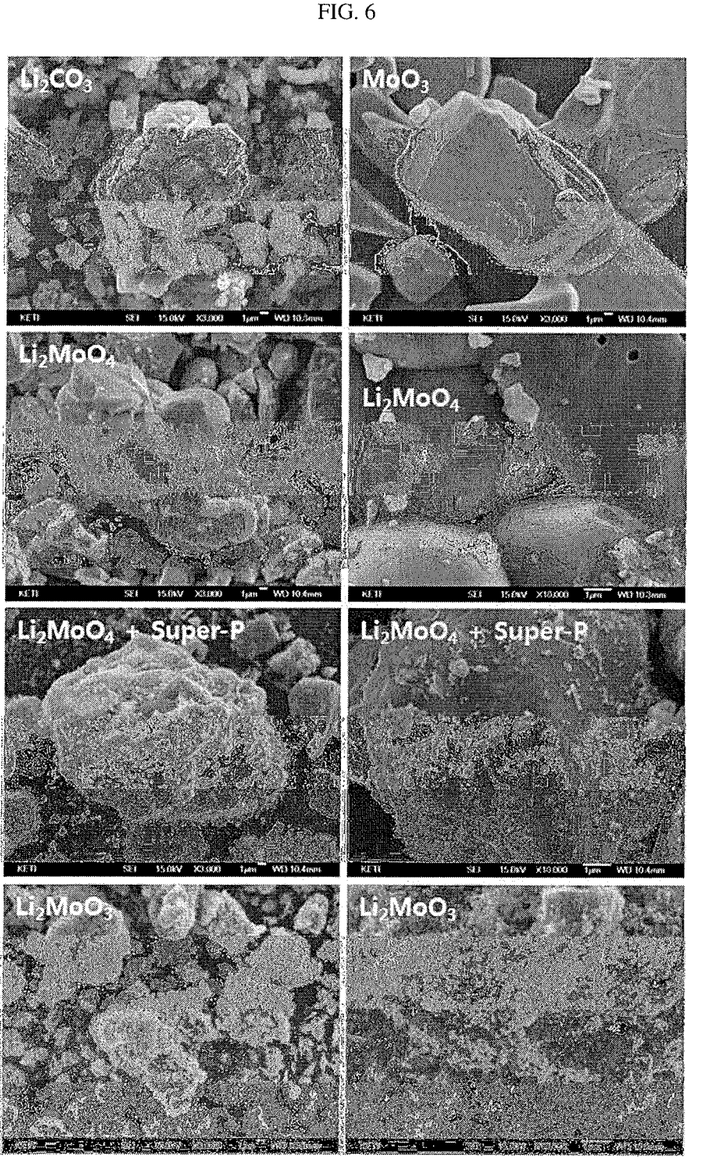
FIG. 6 shows SEM images of the materials used in the production method of FIG. 5 and the resulting cathode additive.

First, FIG. 5 is a flow chart showing the method for producing the cathode active material for the lithium ion capacitor using the cathode additive according to the present invention. FIG. 6 shows SEM images of the materials used in the production method of FIG. 5 and the resulting cathode additive.

The production method of the cathode active material for lithium ion capacitor according to the present invention includes a step S10 of preparing a $Li_2MoO_4$ precursor, a step S20 of reducing the prepared $Li_2MoO_4$ to synthesize $Li_2MoO_3$, and a step S30 of mixing $Li_2MoO_3$ with the carbon-based material to produce the cathode active material.

The step S10 includes a step S12 of mixing $Li_2CO_3$ with $MoO_3$ at a molar ratio of 1:1, and a step S14 of producing a $Li_2MoO_4$ precursor by heat-treatment of the mixture of $Li_2CO_3$ and $MoO_3$ in air at 400 to 1000° C. for 1 to 6 hours. At this time, the step S14 may be performed in air.

Next, the step S20 includes a step S22 of uniformly mixing $Li_2MoO_4$ with 10% by weight or less of Super-P by mechanical milling, and a step S24 of producing $Li_2MoO_3$ by heat-treatment of the mixture of $Li_2MoO_4$ and Super-P under an Ar atmosphere containing 10% or less of $H_2$ gas at 500 to 1000° C. for 10 to 30 hours. At this time, the mixing step by mechanical milling in the step S22 may be performed for 30 minutes. The mechanical milling may be performed by means of for example, a grinding mixer, a ball mill, a vibrating mill, a planetary ball mill, a tube mill, a rod mill, a jet mill, a hammer mill or the like. The reducing atmosphere in the step S24 may be performed under an $Ar_2$ atmosphere containing 5 to 10% of $H_2$ gas.

In the step S30, $Li_2MoO_3$ synthesized in the step S20 is mixed with the carbon-based material to produce the cathode active material for the lithium ion capacitor. At this time, the cathode active material for the lithium ion capacitor may be produced by mixing 3 to 20% by weight of $Li_2MoO_3$ and 80 to 97% by weight of the carbon-based material, and preferably, by mixing 3 to 10% by weight of $Li_2MoO_3$ and 90 to 97% by weight of the carbon-based material. The electrochemical lithium doping may be performed in the voltage region of 5 V or lower.

In order to evaluate the lithium doping and capacitance characteristics of the cathode active material for the lithium ion capacitor using the cathode additive according to the present invention, a lithium ion capacitor was manufactured as follows. According to one specific embodiment of the present invention, the cathode active material includes 3 to 10% by weight of the cathode additive and 90 to 97% by weight of the carbon-based material. At this time, activated carbon may be used as the carbon-based material.

92% by weight of the cathode active material including the 3 to 10% by weight of the cathode additive, 8% by weight of a binder PVdF, and NMP as a solvent were used to prepare a slurry. This slurry was applied to an aluminium mesh (Al mesh) having a thickness of 20 μm, dried, and then compressed by a press. Then, the resulting mesh was dried under vacuum at 120° C. for about 16 hours to prepare a disk-shaped electrode having a diameter of 12 mm. A punched lithium metal film having a diameter of 12 mm was used as a counter electrode, and a PP film was used as a separator. A mixed solution of 1 M $LiPF_6$ and EC/DME (3:7) was used as an electrolytic solution. After the separator was immersed in the electrolytic solution, the resulting separator was inserted between the working electrode and the counter electrode, and then a stainless steel (SUS) case as a test cell for the evaluation, i.e., a non-aqueous lithium ion capacitor having a half cell structure was manufactured.

In this regard, if it is applied as a full cell, the carbon-based material as the anode active material may be at least one of materials composed of crystalline or non-crystalline carbon such as artificial graphite, natural graphite, graphitized carbon fiber, graphitized meso carbon microbead, petroleum coke, resin plastic body, carbon fiber, and pyrolytic carbon.

The cathode additive reversibly intercalates and extracts lithium ions in the voltage region of 5 V or lower, and it is possible to apply the cathode additive to a non-aqueous lithium ion capacitor which is operated in the voltage region of 5 V or lower.

In the process of manufacturing the cathode plate, if necessary, one or two or more of additives selected from a conductive material, a binder, a thickening agent, a filler, a dispersing agent, an ionic conductive material, and a pressure enhancing agent commonly used in the art are added to the cathode active material power containing the cathode additive according to the present invention. Then, an appropriate solvent such as water or organic solvent is added to the mixture to form a slurry or paste. The obtained slurry or paste is applied to an electrode support substrate using a doctor blade, and the resulting substrate is dried and then pressed by a roll press, thereby manufacturing the final cathode plate.

Here, examples of the binder may include rubber binders such as styrene butadiene rubber (SBR) or the like, fluorine-based resins such as polytetrafluoroethylene, polyvinylidene fluoride (PVdF) or the like, thermoplastic resins such as polypropylene, polyethylene or the like, and acrylic resins. The amount of the binder may vary depending on the electrical conductivity of the cathode active material and the electrode shape, but it may be used in an amount of 2 to 40 parts by weight, based on 100 parts by weight of the cathode active material.

If necessary, examples of the conductive material may include graphite, carbon black, acetylene black, ketjen black, carbon fiber, metal powder or the like. The amount of the conductive material may vary depending on the electrical conductivity of the cathode active material and the electrode shape, but it may be used in an amount of 2 to 40 parts by weight, based on 100 parts by weight of the cathode active material.

Further, examples of the thickening agent may include carboxylmethyl cellulose (CMC) or the like.

At this time, the electrode support substrate (also called a 'Current Collector') may be formed of a foil or sheet of silver, copper, nickel, stainless steel, or aluminum, or formed of carbon fibers.

The cathode thus prepared is used to a lithium ion capacitor. The lithium ion capacitor may be manufactured to have any shape such as coin, button, sheet, pouch, cylinder, or prism. The anode, the electrolyte, the separator, etc., of the lithium ion capacitor may be used in the conventional lithium secondary battery.

The electrolytic solution may include, but is not limited to, a non-aqueous electrolytic solution prepared by dissolving a lithium salt in an organic solvent, an inorganic solid electrolytic solution, and a complex of inorganic solid electrolytic solutions.

Here, the solvent of the non-aqueous electrolyte may include carbonate, ester, ether or ketone. Examples of the carbonate may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) or the like. Examples of the ester may include butyrolactone (BL), decanolide, valerolactone, mevalonolactone, caprolactone, n-methyl acetate, n-ethyl acetate, n-propyl acetate or the like. Examples of the ether may include dibutyl ether or the like. Example of the ketone may include poly methyl vinyl ketone. Further, the non-aqueous electrolytic solution according to the present invention is not limited to the type of non-aqueous organic solvent.

Examples of the lithium salts of the non-aqueous electrolytic solution may include one or more selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(CxF_2x+1SO_2)(CyF_2x+1SO_2)$ (wherein x and y are a natural number) and $LiSO_3CF_3$ and mixtures thereof.

The separator may be formed of a porous material such as a porous film, a non-woven fabric or the like which is prepared from polyolefin such as polypropylene (PP) or polyethylene (PE).

If necessary, modifications or variations of the prevention invention in addition to those described herein are possible, and not particularly limited in the present invention.

Advantageous Effects

According to the present invention, a carbon-based anode active material is electrochemically doped with lithium by addition of a cathode additive having a large initial irreversible capacitance to a carbon-based material for a cathode active material of a lithium ion capacitor, thereby providing the lithium ion capacitor with improved charge/discharge capacitance.

Further, the lithium doping using the cathode additive according to the present invention reduces an electrical potential of the anode, thereby improving energy density of the lithium ion capacitor.

Furthermore, the production efficiency of the lithium ion capacitor can be also improved by the simple lithium doping process.

MODE FOR INVENTION

Hereinafter, the preferred Examples are provided for better understanding. However, these Examples are for illustrative purposes only, and the invention is not intended to be limited by these Examples.

Example 1

$Li_2CO_3$ and $MoO_3$ were mixed at a molar ratio of 1:1, and then the mixture of $Li_2CO_3$ and $MoO_3$ was heat-treated in air at 500° C. (Celsius) for 5 hours to produce a lithium composite metal oxide precursor $Li_2MoO_4$. 3.5 parts by weight of Super-P was uniformly mixed based on 100 parts by weight of the resulting $Li_2MoO_4$ by mechanical milling. The mixture of $Li_2MoO_4$ and Super-P was heat-treated under an $Ar_2$ atmosphere with 5% of $H_2$ gas at 700° C. for 10 hours to produce lithium composite metal oxide $Li_2MoO_3$.

3% by weight of the produced lithium composite metal oxide $Li_2MoO_3$ and 97% by weight of activated carbon having a specific surface area of 1,200 $m^2/g$ were mixed to prepare a cathode active material for a lithium ion capacitor. At this time, the activated carbon having an average particle size of 15 μm was used.

Meanwhile, XRD (X-ray diffraction) analysis of the lithium composite metal oxide $Li_2MoO_3$ produced by the above described method was performed to confirm that it has a Rhombohedral crystal structure.

Further, the initial charge-discharge efficiency ($Q_E$) of the lithium composite metal oxide $Li_2MoO_3$ was calculated according to Equation 1 by determining the discharge capacitance ($Q_D$) per unit weight and the charge capacitance ($Q_C$) per unit weight by the electrochemical method in a half cell with lithium metal as a counter electrode.

$$Q_E=(Q_D/Q_C)\times 100 \quad \text{[Equation 1]}$$

wherein $Q_E$ represents an initial charge-discharge efficiency of lithium composite metal oxide, $Q_D$ represents a discharge capacitance (mAh/g) per unit weight of the cathode active material at a Li/Li+ cut-off discharge voltage of 2.3 V, and $Q_C$ represents a charge capacitance (mAh/g) per unit weight of the cathode active material at a Li/Li+ cut-off charge voltage of 4.7 V.

At this time, initial charge-discharge efficiency ($Q_E$) of the prepared lithium composite metal oxide $Li_2MoO_3$ was 43%.

Example 2

A cathode active material for a lithium ion capacitor was prepared in the same manner as in Example 1, except that 5% by weight of lithium composite metal oxide $Li_2MoO_3$ and 95% by weight of activated carbon were mixed.

Example 3

A cathode active material for a lithium ion capacitor was prepared in the same manner as in Example 1, except that 10% by weight of lithium composite metal oxide $Li_2MoO_3$ and 90% by weight of activated carbon were mixed.

Comparative Example 1

A cathode active material for a lithium ion capacitor was prepared in the same manner as in Example 1, except that lithium composite metal oxide $Li_2MoO_3$ was not included.

Experimental Example

Lithium ion capacitors having a half cell structure were manufactured using the cathode active materials according to Example 1 and Comparative Examples 1 to 3 as follows, and then their performances were evaluated.

a) Manufacture of Lithium Ion Capacitor

First, 92 wt % of the cathode active materials according to Example 1 and Comparative Examples 1 to 3 and 8 wt % of a binder PVdF were mixed to prepare slurries using N-methylpyrrolidone (NMP) as a solvent. Each slurry was applied on an aluminum mesh (Al mesh) having a thickness of 20 μm, and the resulting mesh was dried and pressed by a press. Then, the resulting mesh was dried under vacuum at 120° C. for 16 hours to prepare a disk-shaped electrode (cathode) having a diameter of 12 mm.

Further, a punched lithium metal film having a diameter of 12 mm was used as a counter electrode (anode), and a polyethylene (PE) film was used as a separator. At this time, a mixed solution of 1 M $LiPF_6$ and ethylene carbonate/dimethyl carbonate (EC/DMC) (3:7) was used as an electrolytic solution.

After the separator was immersed in the electrolyte, the resulting separator was inserted between the working electrode (cathode) and the counter electrode (anode), and then a stainless steel (SUS) case as a test cell for the evaluation, i.e., a non-aqueous lithium ion capacitor having a half cell structure was prepared.

b) Evaluation of Electrode Performance

As described above, for lithium doping of the half cell lithium ion capacitor manufactured using the cathode active materials according to Examples 1 to 3 and Comparative Example 1, 1 cycle of charge/discharge was performed at a current of 0.2 C (10.6 mA/g) (Pre-Charge and Pre-Discharge), and subsequently 5 cycles of charge/discharge was performed at a current of 0.2 C (10.6 mA/g).

Further, the evaluation results of electrode performance of the lithium ion capacitors including the cathode active materials according to Examples 1 to 3 and Comparative Example 1 during Pre-Charge and Pre-Discharge and 1 cycle of charge/discharge are shown in the following Table 2.

TABLE 1

| | Pre-charge/pre-discharge (lithium doping step) | | | Cycle number: 1 (after lithium doping) | |
|---|---|---|---|---|---|
| | Initial charge electric potential (V) | Initial charge capacitance (mAh/g) | Initial discharge capacitance (mAh/g) | Charge capacitance (mAh/g) | Discharge capacitance (mAh/g) |
| Example 1 | 4.7 | 171.3 | 120.1 | 74.0 | 74.5 |
| Example 2 | 4.7 | 191.3 | 111.7 | 72.3 | 70.1 |
| Example 3 | 4.7 | 259.9 | 111.6 | 74.3 | 71.5 |
| Comparative Example 1 | 4.7 | 141.3 | 105.0 | 63.1 | 62.9 |

Figure 7:
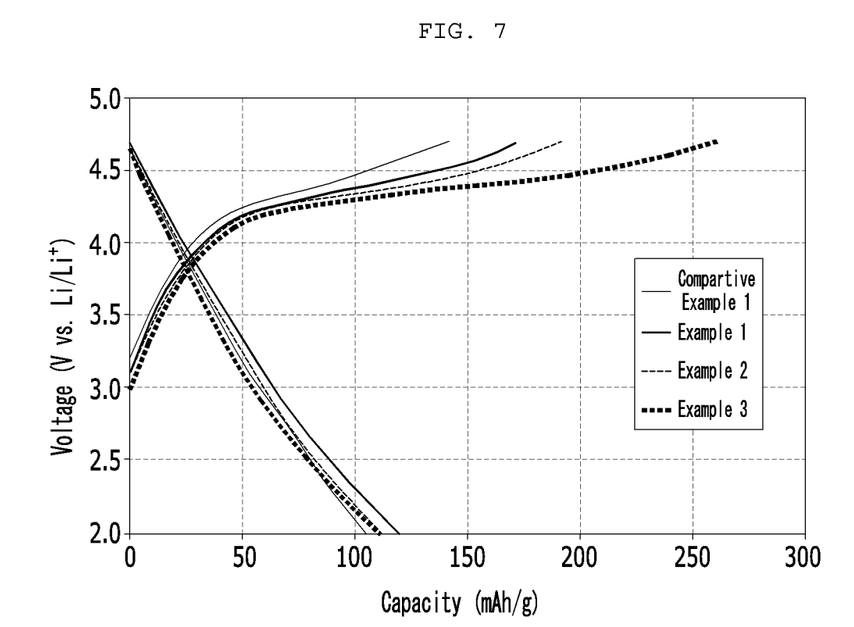
FIG. 7 is a graph showing lithium doping characteristics upon pre-charging/pre-discharging of the lithium ion capacitors which include the cathode active materials according to Examples 1 to 3 and Comparative Example 1 of the present invention.
Figure 8:
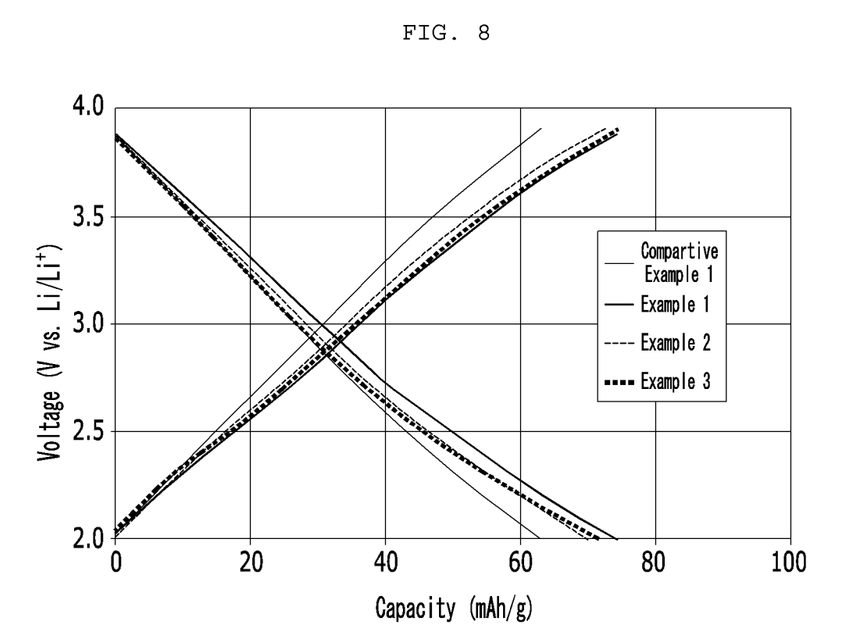
FIG. 8 is a graph showing capacitor characteristics of the lithium ion capacitors which include the cathode active materials according to Examples 1 to 3 and Comparative Example 1 of the present invention, after lithium doping (cycle number: 1)
Figure 9:
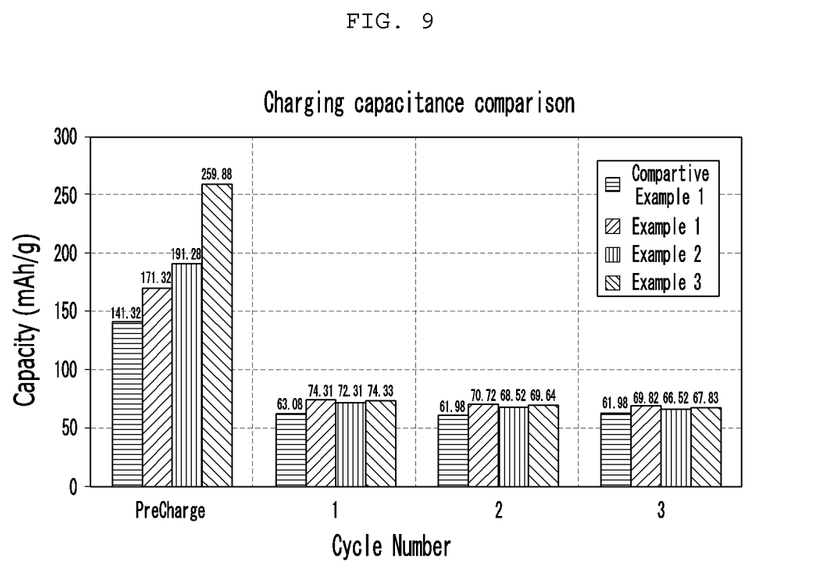
FIG. 9 is a graph showing a charging capacitance comparison between the lithium ion capacitors which include the cathode active materials according to Examples 1 to 3 and Comparative Example 1 of the present invention (pre-charge and cycle number 1-3)
Figure 10:
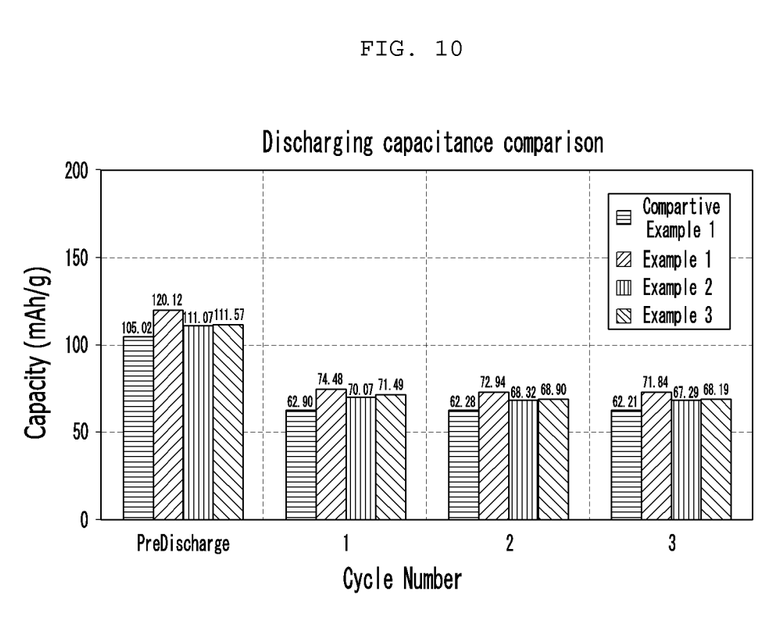
FIG. 10 is a graph showing a discharging capacitance comparison between the lithium ion capacitors which include the cathode active materials according to Examples 1 to 3 and Comparative Example 1 of the present invention (pre-discharge and cycle number 1-3).

Meanwhile, the evaluation results of electrode performance of the lithium ion capacitors including the cathode active materials according to Examples 1 to 3 and Comparative Example 1 are shown in the graphs of FIGS. 7 to 10. Here, FIGS. 7 and 8 are graphs showing the evaluation result at pre-charge and pre-discharge step for lithium doping of the anode and the result of charge/discharge test at first cycle (Cycle Number: 1), respectively. In addition, FIGS. 9 and 10 are graphs showing the evaluation result at pre-charge and pre-discharge step and the result of charge/discharge test at a cycle number of 1 to 3, respectively.

As shown in FIGS. 7 to 10, the lithium ion capacitors of Examples 1 to 3 including the $Li_2MoO_3$ cathode additive of Example 1 exhibited higher charge/discharge capacitance than the lithium ion capacitor of Comparative Example 1 including only activated carbon as the cathode active material.

In particular, as shown in Table 1, the lithium ion capacitors of Examples 1 to 3 including the lithium composite metal oxide having a large initial irreversible capacitance according to the present invention exhibited an initial charge capacitance of 171.3 to 259.9 mAh/g and an initial discharge capacitance of 111.6 to 120.1 mAh/g at the lithium doping step, and a charge capacitance of 72.3 to 74.4 mAh/g and a discharge capacitance of 70.1 to 74.5 mAh/g after the lithium doping step, indicating very excellent characteristics. In contrast, the lithium ion capacitor of Comparative Example 1 exhibited an initial charge capacitance of 141.3 mAh/g and an initial discharge capacitance of 105.0 mAh/g at the lithium doping step, and a charge capacitance of 63.1 mAh/g and a discharge capacitance of 62.9 mAh/g after the lithium doping step, indicating remarkably poor characteristics.

Therefore, it was found that electrochemical doping of the anode carbon-based material with lithium using the $Li_2MoO_3$ transition metal oxide of the present invention as the cathode additive contributes to the capacitor characteristics, thereby providing the lithium ion capacitor with improved electrochemical characteristics and energy density.

The invention claimed is:

1. A cathode active material for a lithium ion capacitor, comprising a lithium composite metal oxide represented by the following Chemical Formula 1 and a carbon-based material:

$$Li_xM_yO_z$$ [Chemical Formula 1]

wherein x, y, and z are $0<x\le2$, $0<y\le3$, and $0<z\le4$, respectively, and

M is one or more selected from the group consisting of Mo, Ir, and Pt.

2. The cathode active material for a lithium ion capacitor according to claim 1, wherein the lithium composite metal oxide has an initial charge-discharge efficiency ($Q_E$) of the following Equation 1 of 50% or less:

$$Q_E=(Q_D/Q_C)\times100$$ [Equation 1]

wherein $Q_E$ represents an initial charge-discharge efficiency of lithium composite metal oxide, $Q_D$ represents a discharge capacitance (mAh/g) at a Li/Li+ cut-off discharge voltage of 2.3 V, and $Q_C$ represents a charge capacitance (mAh/g) at a Li/Li+ cut-off charge voltage of 4.7 V.

3. The cathode active material for a lithium ion capacitor according to claim 1, wherein the lithium composite metal oxide is one or more selected from the group consisting of $Li_2MoO_3$, $Li_2PtO_3$, and $Li_2IrO_3$.

4. The cathode active material for a lithium ion capacitor according to claim 1, wherein the lithium composite metal oxide has a crystal structure of Rhombohedral.

5. The cathode active material for a lithium ion capacitor according to claim 1, wherein the lithium composite metal oxide reversibly intercalates or extracts lithium ions in a voltage region of 0 V to 5 V.

6. The cathode active material for a lithium ion capacitor according to claim 1, wherein the carbon-based material has a specific surface area of 500 m$^2$/g or more.

7. The cathode active material for a lithium ion capacitor according to claim 1, wherein the carbon-based material is one or more selected from the group consisting of activated carbon, a composite of activated carbon and metal oxide, and a composite of activated carbon and a conductive polymer.

8. The cathode active material for a lithium ion capacitor according to claim 1, comprising 0.5 to 50% by weight of the lithium composite metal oxide and 50 to 99.5% by weight of the carbon-based material.

9. A method for producing a cathode active material for a lithium ion capacitor, comprising the steps of:

reducing a lithium composite metal oxide precursor represented by the following Chemical Formula 2 to produce lithium composite metal oxide represented by the following Chemical Formula 1; and mixing the lithium composite metal oxide with a carbon-based material:

$Li_xM_yO_z$ [Chemical Formula 1]

$Li_{x'}M'_{y'}O_{z'}$ [Chemical Formula 2]

wherein x, y, z, x', y', and z' are $0<x\leq2$, $0<y\leq3$, $z\ 0<z\leq4$, $0<x'\leq2$, $0<y'\leq3$, and $1<z'\leq5$, respectively and M and M' are one or more selected from the group consisting of Mo, Ir, and Pt, respectively.

10. The method according to claim 9, wherein the lithium composite metal oxide precursor is reduced by heat-treatment at 500 to 1,000° C.

11. A lithium ion capacitor, comprising the cathode active material of any one of claims 1 to 8.

12. The lithium ion capacitor according to claim 11, wherein the lithium ion capacitor comprises a cathode including a cathode active material; an anode including an anode active material; and a separator between the cathode and the anode, and the anode is supplied with lithium ions only from the cathode.

13. The lithium ion capacitor according to claim 11, comprising a carbon-based anode active material capable of reversibly intercalating or extracting lithium ions in a voltage region of 0 V to 5 V.

* * * * *